(12) United States Patent
Platt et al.

(10) Patent No.: US 6,935,832 B1
(45) Date of Patent: Aug. 30, 2005

(54) PORTABLE POWER GENERATING DEVICES

(75) Inventors: Michael D. Platt, Yates City, IL (US); Eric E. Platt, Gilson, IL (US)

(73) Assignee: Natural Forces, LLC, Edelstein, IL (US)

( * ) Notice: Subject to any disclaimer, the term of this patent is extended or adjusted under 35 U.S.C. 154(b) by 0 days.

(21) Appl. No.: 10/442,477

(22) Filed: May 21, 2003

Related U.S. Application Data (60) Provisional application No. 60/382,247, filed on May 21, 2002.

(51) Int. Cl.$^7$ ............................................... F03B 7/00
(52) U.S. Cl. ..................... 415/8; 415/126; 415/908; 416/85; 416/86; 416/245 R
(58) Field of Search .................. 415/4.3, 4.5, 7, 415/8, 126, 908; 416/84, 85, 86, 245 R; 417/337; 290/43, 54

(56) References Cited

U.S. PATENT DOCUMENTS

| 852,022 | A | * | 4/1907 | Kirschweng | .................... | 415/7 |
| 891,671 | A | * | 6/1908 | Coon | ............................ | 415/7 |
| 1,476,229 | A | * | 12/1923 | Suess | .......................... | 60/696 |
| 3,904,323 | A | * | 9/1975 | Martin et al. | ................ | 417/334 |
| 4,143,990 | A | | 3/1979 | Atencio | | |
| 4,301,377 | A | * | 11/1981 | Rydz | ........................... | 290/43 |
| 4,441,029 | A | | 4/1984 | Kao | | |
| 5,451,137 | A | | 9/1995 | Gorlov | | |
| 6,210,113 | B1 | | 4/2001 | Ihrenberger | | |
| 6,616,403 | B1 | * | 9/2003 | Smith et al. | ................. | 415/3.1 |

\* cited by examiner

*Primary Examiner*—Ninh H. Nguyen
(74) *Attorney, Agent, or Firm*—Husch & Eppenberger, LLC; Robert C. Haldiman (57) ABSTRACT

Portable power generating devices are provided for converting potential energy from flowing water, water current, blowing air or air current to mechanical and/or electrical energy. The potential energy is converted to a rotational movement, and the rotational energy is communicated to power conversion units for conversion, wherein the rotational movement is converted to mechanical, electrical or some other useable or useful energy.

19 Claims, 11 Drawing Sheets

PORTABLE POWER GENERATING DEVICES

CROSS REFERENCE TO RELATED APPLICATIONS

This application claims priority of prior Provisional Application No. 60/382,247 filed in the United States of America on May 21, 2002.

TECHNICAL FIELD OF THE INVENTION

The invention relates to portable power generating devices and more particularly to portable devices for converting potential energy from flowing water, water current, blowing air or air current to mechanical and/or electrical energy.

DESCRIPTION OF THE RELATED ART

Hydropower energy is the mechanical and/or electrical energy converted from potential energy in moving water or water current. Hydroelectric power is the electrical power converted from the potential energy in, among other things, moving water or water current. It is important to note that a mechanical function is usually required to convert potential energy in moving water or water current to hydroelectric power.

A shortcoming of many existing hydropower or hydroelectric (hereinafter individually and collectively referred to as "hydropower") systems are the costs associated with constructing these massive structures. These structures include, but are not limited to, dams, intakes, scrolls, bends, diffusers, or other permanent structures (hereinafter individually and collectively referred to as "permanent structures"). The purpose of these permanent structures is to manipulate the flow of water and to capture or convert the potential energy from moving water or water currents to useful mechanical and/or electrical energy. These permanent structures have numerous negative consequences.

Permanent structures are very expensive to construct and maintain and the costs associated with decommissioning these permanent structures are very high. Large areas of land and waterways are occupied by these large, intrusive, and foreign permanent structures. Unique natural wildlife is sacrificed to construct these permanent structures.

Moreover, these permanent structures seriously alter the hydrology of impounded waterways creating flood hazards and safety concerns to surrounding areas. In Oregon, Washington, and Idaho, a multi-million dollar salmon fishery was destroyed resulting in unemployment for thousands of people.

Environmental groups have created fierce opposition to the construction of new permanent structures and have lobbied for the removal of existing permanent structures. Environmentalists have protested against these permanent structures because of their impact to the environment.

The present invention is directed to overcoming one or more of the problems set forth above.

BRIEF SUMMARY OF THE INVENTION

An aspect of the invention is to provide portable power generating devices for converting potential energy in moving water to useful energy.

In another aspect of this invention there is provided portable power generating devices for converting potential energy in moving water to mechanical energy.

Yet another aspect of this invention there is provided portable power generating devices for converting potential energy in moving water to electrical energy.

Still another aspect of this invention there is provided an inexpensive and simplistic method for converting potential energy in moving water to useful mechanical and/or electrical energy.

Another aspect of this invention there is provided portable power generating devices that have a minor impact on the environment.

Yet another aspect of this invention there is provided portable power generating devices for converting blowing air or air current to useful, mechanical and/or electrical energy. In another aspect of this invention there is provided an inexpensive and simplistic method for converting potential energy in blowing air or air current to useful mechanical and/or electrical energy.

BRIEF DESCRIPTION OF THE SEVERAL VIEWS OF THE DRAWING

Reference is now made to the drawings, which illustrate the best known mode of carrying out the invention and wherein the same reference characters indicate the same or similar parts throughout the views.

DETAILED DESCRIPTION OF THE INVENTION

Figure 1:
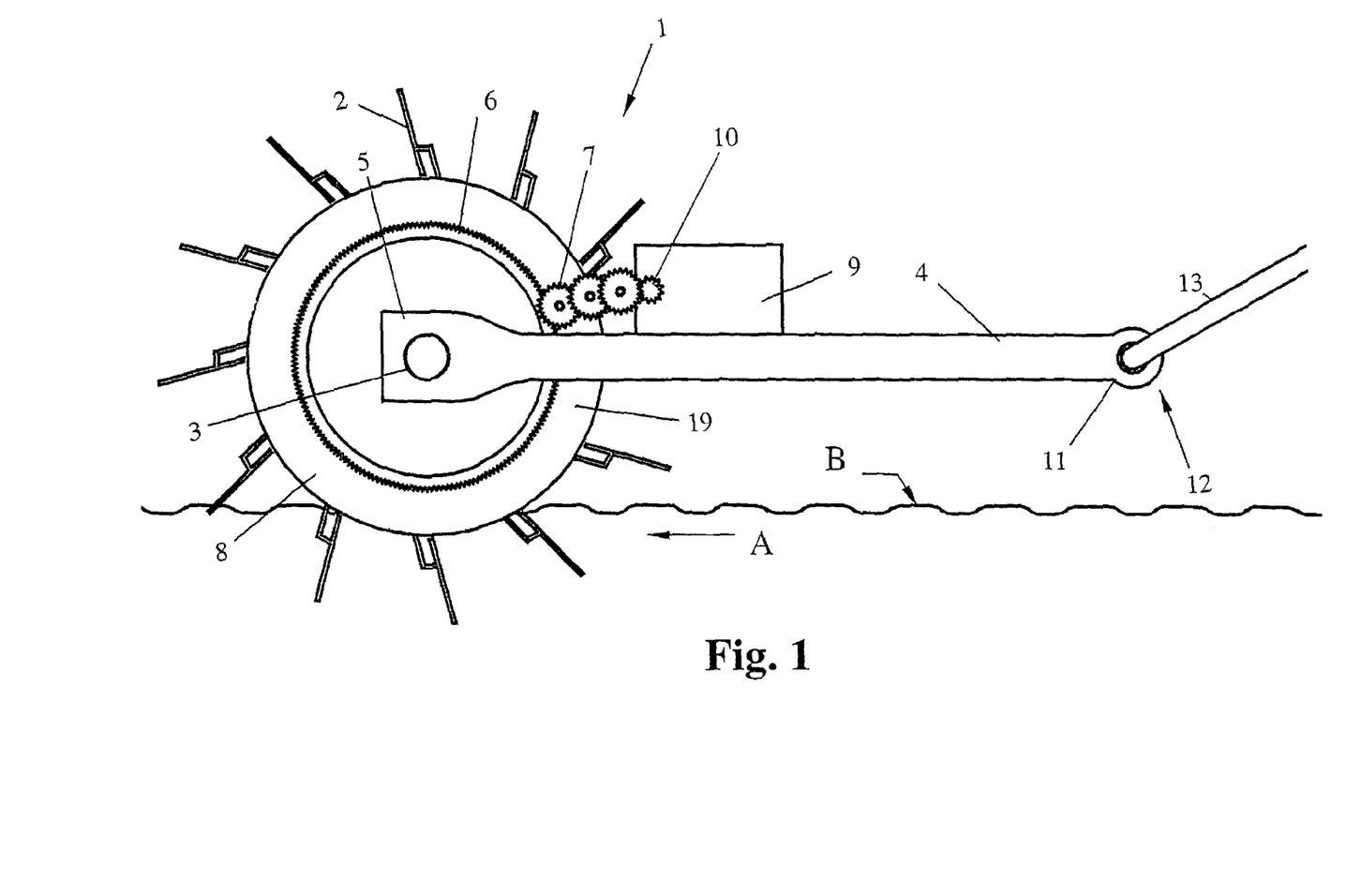
FIG. 1 is a side view of a single drum portable power-generating device.
Figure 1A:
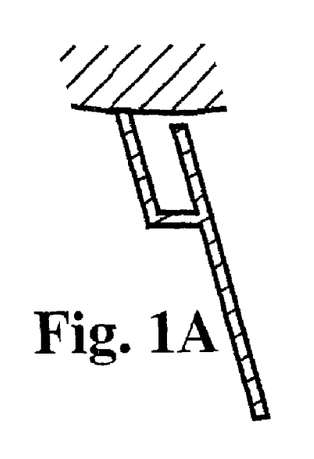
FIG. 1A is an enlarged view of a vane for the single drum portable power generating device.
Figure 1B:
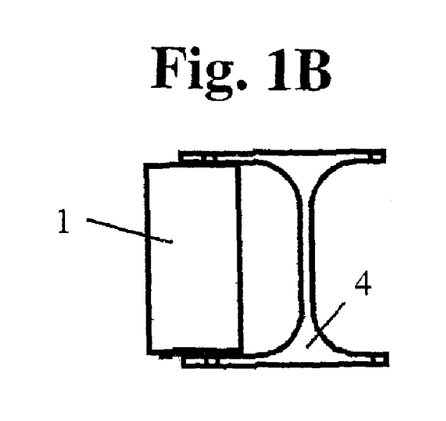
FIG. 1B is a top view of the single drum portable power generating device illustrating a frame arrangement.
Figure 1C:
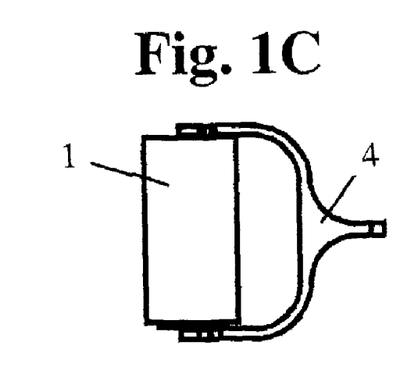
FIG. 1C is a top view of the single drum portable power generating device illustrating a second frame arrangement.

FIG. 1 illustrates a single drum portable power generating device, generally designated 1. The portable power generating device 1 is for use in conjunction with a moving fluid, such as water. Arrow "B" shows a surface of the moving fluid and arrow "A" shows which direction the fluid is moving in. The single drum portable power generating device 1 has a single drum 19, which is cylindrical and has buoyancy. The single drum portable power generating device 1 has vanes 2 operatively mounted around the outer circumference thereon. The vanes 2 extend outwardly from the outer circumference of the single drum 19 of the single drum portable power generating device 1. In all embodiments discussed hereinafter, the vanes can be of various configurations and designs such as straight, curved, angled, cupped, ribbed, concave, rigid, flexible, steel, plastic or any other similar structure. The configuration and design of the vanes 2 are dependent upon many factors, such as, obtaining the maximum possible potential energy from the moving water or current. In the preferred embodiment for the single drum portable power generating 1, the vanes 2 are angled against current or towards the water flow as illustrated in FIG. 1A. In other embodiments, the angle and length of the vanes 2 are varied. For example, the angle of the vanes 2 may be transverse to the point of contacts with the single drum 19 of the single drum portable power generating device 1. The length, positioning and angle of the vanes 2 determine the amount of potential energy from moving water or water current that will be captured and converted to mechanical and/or electrical energy explained hereinafter. An axle 3 is operatively mounted through the center of the single drum 19 of the single drum portable power generating device 1. A frame 4 is operatively connected to the axle 3 at an at least one first end 5 of the frame 4. The axle 3 is rotatably mounted at the at least one first end 5 of the frame 4. The axle 3 is able to rotate freely at the at least one first end 5. The frame 4 receives the axle 3 on each side of the single drum 19 in the preferred embodiment as shown in FIG. 1B. The frame 4 receives the axle 3 on each side of the single drum 19 in an alternative embodiment as shown in FIG. 1C. The frame 4 has at least one anchoring yoke 11 at an at least one second end 12 of the frame 4. The at least one anchoring yoke 11 is used to anchor the single drum portable power generating device 1.

At least one anchoring cable 13 is connected to at least one anchoring yoke 11 and an anchoring device (not shown) to preclude the single drum portable power generating device 1 from being carried away by the current or flowing water. The at least one anchoring cable 13 is a cable, rope, chain or any similar device. The at least one gear 6 is operatively mounted juxtaposed to a first side 8 of the single drum 19. At least one gear 6 rotates as the single drum 19 rotates. As moving water contacts the vanes 2, the single drum 19, the at least one gear 6 and the axle 3 rotate in the depicted embodiment. In an alternative embodiment, the axle 3 is bearing mounted and does not rotate with the single drum 19. At least one transition gear 7 is operatively mounted on the frame 4. The at least one transition gear 7 interacts with the at least one gear 6. As the at least one gear 6 rotates, the at least one transition gear 7 rotates. In an alternative embodiment, a second of at least one gear 6 is located on a second side (not shown) of the single drum 19 or opposite the first side 8. In an alternative embodiment, a number of at least one transition gears 7 interact with each other and/or the at least one gear 6 as shown in FIG. 1. Obviously if the at least one gear 6 is placed on the first side 8 and the second side, or both sides of the single drum 19, a second or second set of at least one transition gear 7 would be required for both sides. At least one power conversion unit 9 is operatively mounted to the frame 4. The power conversion unit 9 is an electrical generator, hydraulic pump, air pump, or water pump. The at least one power conversion unit 9 has at least one power conversion unit gear 10. The at least one power conversion unit 9 is used to convert the rotational movement from the power conversion unit gear 10 to electrical, mechanical or some other form of useful and useable energy. The at least one power conversion unit gear 10 is operatively mounted to the at least one power conversion unit 9 and interacts with the at least one transition gear 7. If the at least one gear 6 is placed on the first side 8 and the second side, or both sides of the single drum 19, the at least one power conversion unit 9 and at least one power conversion unit gear 10 is placed on the second side of the single drum 19 also.

The single drum portable power generating device 1 is anchored to the anchoring device via the at least one anchoring cable 13 and the at least one anchoring yoke 11 so that the single drum portable power generating device 1 is positioned in a current or moving water. The current or moving water contacts the vanes 2 thereby causing the single drum 19 to rotate. As the single drum 19 rotates, the at least one gear 6 and the axle 3 rotate in the depicted embodiment. However, in other embodiments the axle 3 is bearing mounted and does not rotate with the single drum 19. The at least one gear 6 operatively communicates with the at least one transition gear 7. The at least one transition gear 7 operatively communicates to or rotates the power conversion unit gear 10. The at least one power conversion unit gear 10 is rotated by the at least one transition gear 7 and operatively communicates with the at least one power conversion unit 9. As the at least one power conversion unit gear 10 rotates, the at least one power conversion unit 9 converts the rotational energy to electrical, mechanical or some other form of useful and useable energy.

Figure 2:
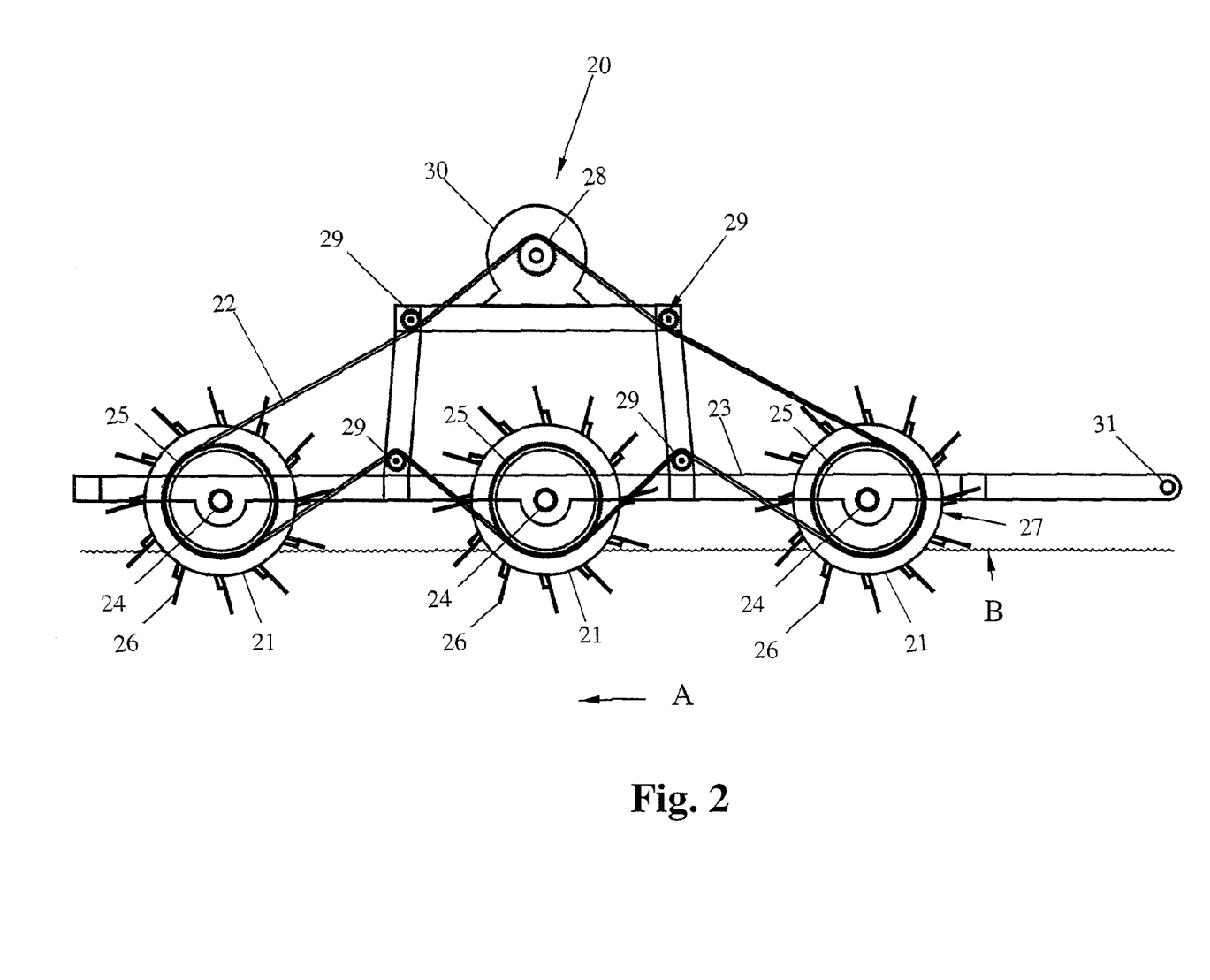
FIG. 2 is a side view of a multiple drum portable power generating device.

FIG. 2 illustrates a multiple drum portable power generating device 20. The multiple drum portable power generating device 20 is similar to the single drum portable power generating device 1 but includes multiple drums 21, at least one collective 22 and various other components described hereinafter. The multiple portable power generating device 20 has the multiple drums 21, which are cylindrical and have buoyancy. The multiple drums 21 have vanes 26 operatively mounted around the outer circumference thereon. The vanes 26 extend outwardly from the outer circumference of the multiple drums 21 of the multiple portable power generating device 20. In the preferred embodiment, the vanes 26 are angled against current or towards the water flow as illustrated in FIG. 1A. In other embodiments, the angle and length of the vanes 26 are varied. For example, the angle of the vanes 26 may be transverse to the point of contacts with the multiple drums 21. The length, positioning and angle of the vanes 26 determine the amount of potential energy from moving water or water current that will be captured and converted to mechanical and/or electrical energy explained hereinafter. The multiple drums 21 are operatively connected to multiple frames 23 on each end via multiple axles 24.

The multiple axles 24 are operatively mounted through the center of the multiple drums 21. The multiple axles 24 are rotatably mounted to the multiple frames 23. Multiple gears 25 are operatively mounted juxtaposed to a first side 27 of the multiple drums 21 of the multiple drum portable power generating device 20. The multiple gears 25 rotate as the multiple drums 21 rotate because of the at least one collective 22 connection. As moving water contacts the vanes 26, the multiple drums 21 and multiple gears 25 of the multiple portable power generating device 20 rotate thereby rotating the multiple axles 24 because the multiple axles 24 are able to rotate freely at the ends in contact with the frame 23.

The multiple gears 25 are operatively connected to at least one power conversion unit gear 28 via the at least one collective 22. Multiple transition gears 29 are operatively connected to the multiple frames 23 and are used to transfer the rotation from the multiple gears 25 to the power conversion unit gear 28 via the collective 22. As the multiple gears 25 rotate, the conversion 22 is actuated or moved thereby moving the multiple transition gears 29 and the at least one power conversion unit gear 28. In the preferred embodiment, the collective 22 is a chain. The at least one power conversion unit gear 28 is operatively connected to at least one power conversion unit 30. The power conversion unit 30 is an electrical generator, hydraulic pump, air pump, or water pump. The at least one power conversion unit 30 is used to convert the rotational movement to electrical, mechanical or some other form of useful and useable energy. It is obvious to those skilled in the art that the at least one power conversion unit 30, the at least one power conversion unit gear 28 and associated components could be placed on each end of the multiple drums 21 of the portable power generating device 20. At least one anchoring yoke 31 is located at one end of and is operatively connected to the multiple frames 23. The at least one anchoring yoke 31 is used to anchor the multiple drum portable power generating device 20.

At least one anchoring cable (not shown) is connected to the at least one anchoring yoke 31 and an anchoring device (not shown) to preclude the multiple drum portable power generating device 20 from being carried away by the current or flowing water. The anchoring cable is a cable, rope, chain or any similar device.

The multiple drum portable power generating device 20 is anchored to the anchoring device via the at least one anchoring cable and the at least one anchoring yoke 31 so that the multiple drum portable power generating device 20 is positioned in a current or moving water. The current or moving water contacts the multiple vanes 26 thereby causing the multiple drums 21 to rotate. As the multiple drums 21 rotate, the multiple gears 25 and multiple axles 24 rotate such that the multiple gears 25 rotate, in this example, clockwise causing the at least one collective 22 to move thereby rotating the multiple transition gears 29 counterclockwise. In other examples, the multiple axles 24 are each bearing mounted such that they do no rotate with the multiple drums 21. The multiple gears 25, multiple transition gears 29, and at least one collective 22 operatively communicate with the power conversion unit gear 28. The at least one power conversion unit gear 28 is rotated and operatively communicates with the at least one power conversion unit 30. As the at least one power conversion unit gear 28 rotates, the at least one power conversion unit 30 converts the rotational energy to electrical, mechanical or some other form of useful and useable energy.

Figure 3:
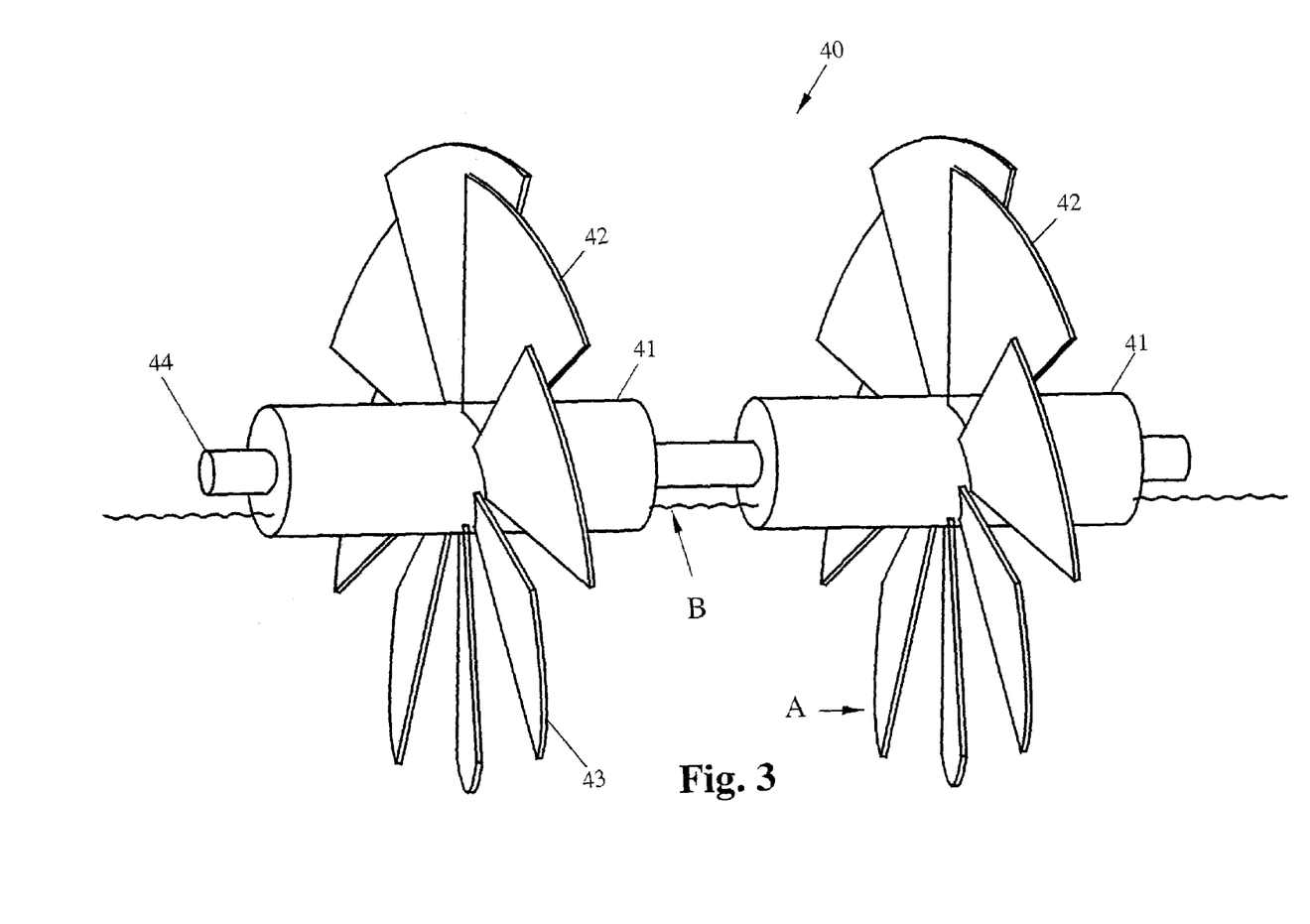
FIG. 3 is a perspective view of a spiral portable power generating device.

FIG. 3 illustrates a spiral portable power generating device 40 used for converting potential energy from flowing water or water current to mechanical and/or electrical energy. The spiral portable power generating device 40 has at least one drum 41. The at least one drum 41 is cylindrical and has buoyancy. In alternative embodiments, the at least one drum 41 is a cylindrical tube or axle of variable length having buoyancy. The at least one drum 41 has vanes 42 operatively mounted around the outer circumference thereon. The vanes 42 extend outwardly from the outer circumference of the multiple drums 41 of the spiral portable power generating device 40. However unlike the FIGS. 1 and 2, the vanes 42 do not extend along the longitudinal of the at least one drum 41.

Rather, the vanes 42 are substantially transverse to the at least one drum 41. The thickness section 43 of the vanes 42 substantially face the current or moving water. The vanes 42 are angled so that the current or moving water will cause the vanes 42 and the at least one drum 41 to rotate. The at least one drum 41 is operatively mounted on a collective output 44. As the at least one drum 41 rotates, the collective output 44 rotates. The collective output 44 is operatively connected to a collective (not shown). For all embodiments contained herein, the collective is any arrangement of axles, gears, pulleys, chains, belts sprockets, shafts, pumps, plates, clutches or cables that transfers rotational force from any axle or collective output. Specific embodiments illustrated herein are the best mode operation and not meant to be limiting to said illustration. The collective transfers the rotational movement to at least one power conversion unit (not shown), wherein the at least one power conversion unit converts the rotational movement to electrical, mechanical or some other form of useful and useable energy. The power conversion unit is an electrical generator, hydraulic pump, air pump, or water pump. The spiral portable power generating device 40 is anchored by at least one anchoring cable (not shown) attached to an anchoring device (not shown).

The spiral portable power generating device 40 is anchored to the anchoring device via the at least one anchoring cable or the collective, and the at least one anchoring yoke so that the spiral portable power generating device 40 is positioned in a current or moving water. The current or moving water contacts the vanes 42 thereby causing the vanes 42 and the at least one drum 41 to rotate. As the at least one drum 41 rotates, the collective output 44 rotates. The collective output 44 operatively communicates with the collective. The collective operatively communicates to the at least one power conversion unit, and the at least one power conversion unit converts the rotational energy to electrical, mechanical or some other form of useful and useable energy.

Figure 4:
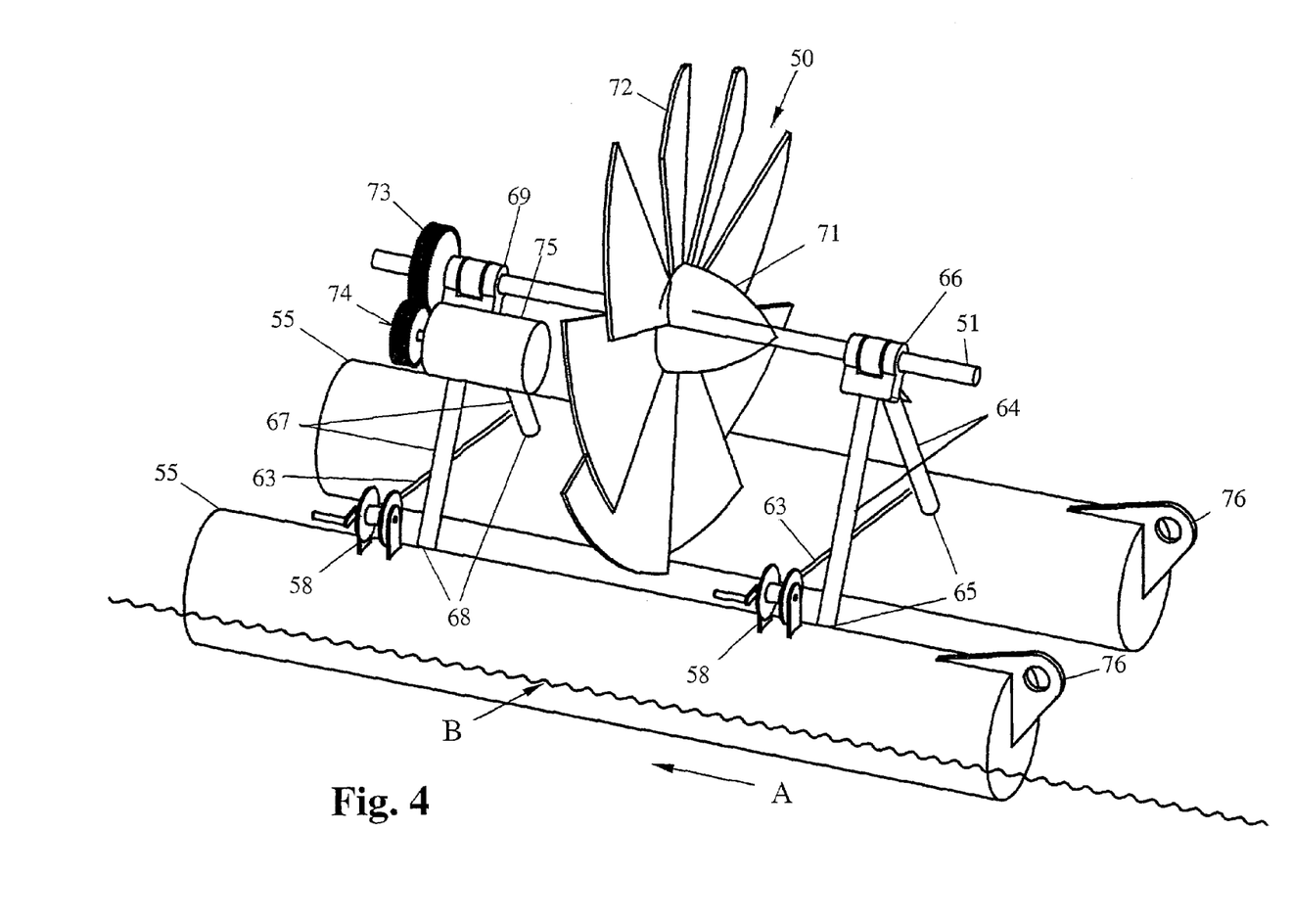
FIG. 4 is a perspective view of a fan turbine portable power generating device.
Figure 5:
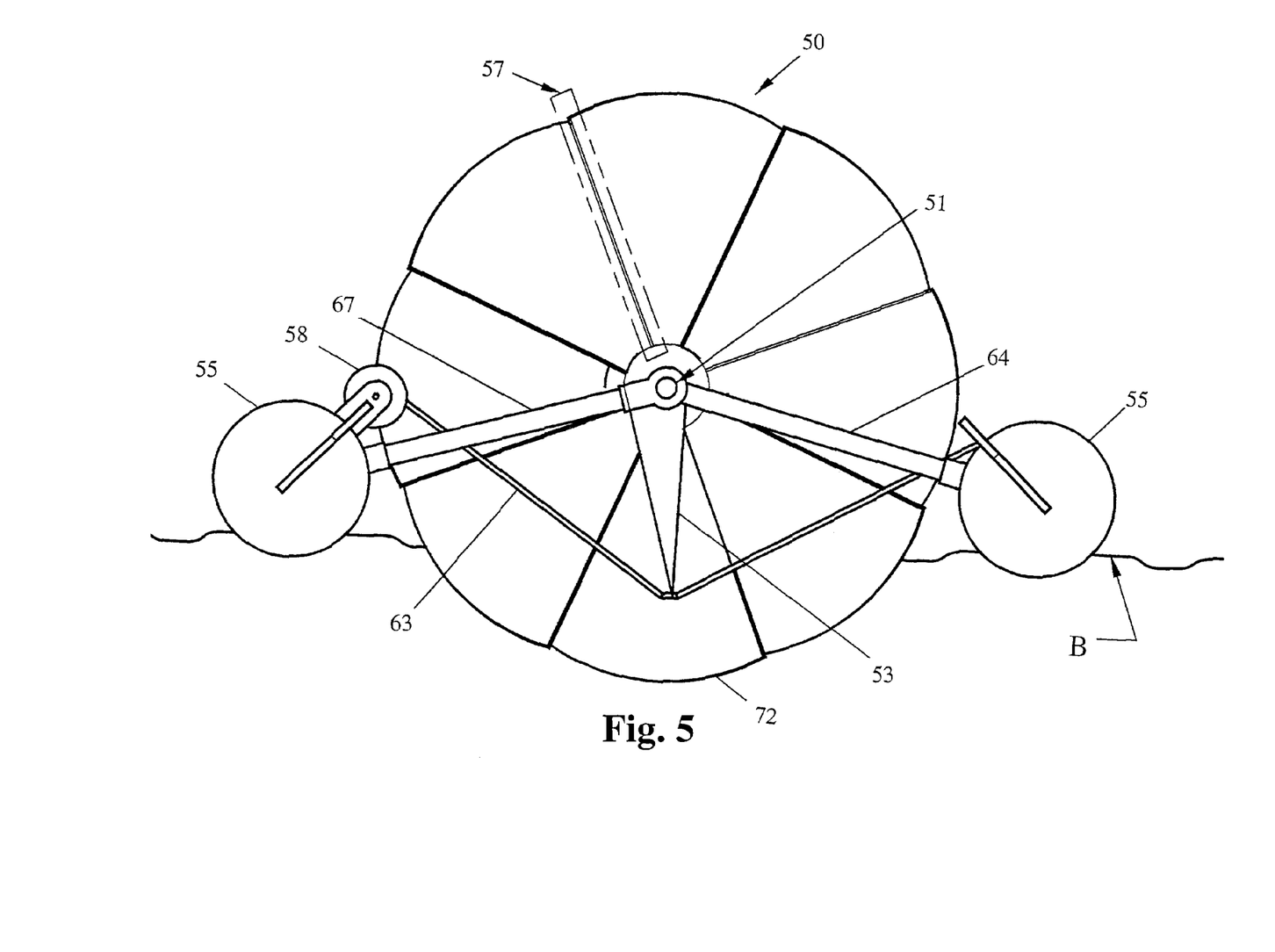
FIG. 5 is a front view of the fan turbine portable power generating device illustrated in FIG. 4.

FIGS. 4 and 5 illustrate a fan turbine portable power generating device 50 used for converting potential energy from flowing water or water current to mechanical and/or electrical energy. Moreover, when the fan turbine portable power generating device 50 is in an upright position, it is used for converting potential energy from blowing wind or air current to mechanical and/or electrical energy. The fan turbine portable power generating device 50 is mounted on a plurality of pontoons 55. The plurality of pontoons 55 are substantially cylindrical and have buoyancy. In alternative embodiments, a plurality of drums, axles or similar devices having buoyancy are used in place of the plurality of pontoons 55. The plurality of pontoons 55 have a plurality of anchoring yokes 76. Referring now to FIG. 4, the plurality of anchoring yokes 76 are used to anchor the fan turbine portable power generating device 50. Anchoring cables (not shown) are connected to the plurality of anchoring yokes 76 and an anchoring device (not shown) to preclude the fan turbine portable power generating device 50 from being carried away by the water current, flowing water, blowing wind or air current. The anchoring cables are cables, ropes, chains or any similar devices. At least one cable and winch 63 connect the plurality of pontoons 55. The at least one cable and winch 63 control the depth of a plurality of vanes 72 that will be submerged in the water. The at least one cable and winch 63 is used to vertically raise and lower the plurality of vanes 72 so that the depth of submersion of the plurality of vanes 72 can be controlled. Front struts 64 have bottom ends 65 rotatably mounted on the plurality of pontoons 55 and angled inwardly and front top ends 66 of the front struts 64 are rotatably connected together such that when the cable and winch 63 are moved so too does the angle of the front struts 64. Rear struts 67 have rear bottom ends 68 rotatably mounted on the plurality of pontoons 55 and angled inwardly and rear top ends 69 of the rear struts 67 are rotatably connected together such that when the cable and winch 63 are moved so to does the angle of the rear struts 67. An axle 51 is rotationally and operatively mounted from the top ends 66 of the front struts 64 to the top ends 69 of the rear struts 67. A collective gear 73 is operatively mounted around the axle 51.

A power conversion unit gear 74 is operatively mounted to a power conversion unit 75. The power conversion unit 75 is an electrical generator, hydraulic pump, air pump, or water pump. As the axle 51 and the collective gear 73 rotate, the collective gear 73 interacts and rotates the power conversion unit gear 74. A nose cone 71 is operatively mounted between the front struts 64 and the rear struts 67. The plurality of vanes 72 are operatively mounted around the circumference of the axle 51 and operatively mounted to the nose cone 71. The plurality of vanes 72 are arranged to rotate when acted on by water current, moving water, blowing wind or air current. When the plurality of vanes 72 rotate, the axle 51, the collective gear 73 and power conversion unit gear 74 rotate. The power conversion unit 75 receives and converts the rotational energy from the power conversion unit gear 74 to electrical, mechanical or some other form of useful and useable energy.

FIG. 5 illustrate a close up of a front view of the fan turbine portable power generating device 50 shown in FIG. 4 without the nose cone 71 attached thereto. The axle 51 is rotatably mounted to at least one middle section 53. The at least one middle section 53 is operatively connected to the front struts 64 and/or rear struts 67. The plurality of vanes 72 are operatively mounted to a circumference of the axle 51. The plurality of vanes 72 are angled so that the water current, moving water, blowing wind or moving air causes the plurality of vanes 72 to rotate. At least one space 57 is provided between each of the plurality of vanes 72. The plurality of vanes 72 are transverse to the water current, moving water, blowing wind or moving air.

The depth of submersion of the plurality of vanes 72 of the fan turbine portable power generating device 50 in the water is adjustable.

In an alternative embodiment, the fan turbine portable power generating device 50 is placed in the upright position, wherein the plurality of the vanes 72 are not submerged in the water and the fan turbine portable power generating device 50 is used for converting potential energy from blowing wind or air current to mechanical and/or electrical energy. The upright position is desirable when water surfaces freeze not allowing submersion of the plurality of the vanes 72 therein.

In the preferred embodiment, a cable and winch 63 are used to control the depth of submersion of the plurality of the vanes 72 of the fan turbine portable power generating device 50 in the water. The cable and winch 63 are used to move the plurality of pontoons 55 toward and away from each other thereby controlling the depth of submersion of the plurality of vanes 72 of the fan turbine portable power generating device 50 in the water. The cable and winch 63 are for illustration purposes, and are not meant to be limiting. Other embodiments are able to perform the same function and are known by those skilled in the art.

Referring once again to FIG. 4, the fan turbine portable power generating device 50 is anchored to the anchoring device via the anchoring cables and the anchoring yokes 76 so that the fan turbine portable power generating device 50 is positioned on a body of water with the plurality of vanes 72 submerged in the water facing the direction of the water current or flowing water or when the plurality of vanes 72 are completely removed from the water, in the direction of the blowing wind or moving air. The water current, flowing water, blowing wind or moving air contacts and causes the plurality of vanes 72 to rotate. As the plurality of vanes 72 rotate, the axle 51 and the collective gear 73 rotate. As the collective gear 73 rotates, it interacts with the power conversion unit gear 74 causing it to rotate. The power conversion unit gear 74 operatively communicates with the power conversion unit 75. As the power conversion unit gear 74 rotates, the power conversion unit 75 converts the rotational energy to electrical, mechanical or some other form of useful and useable energy.

Figure 6:
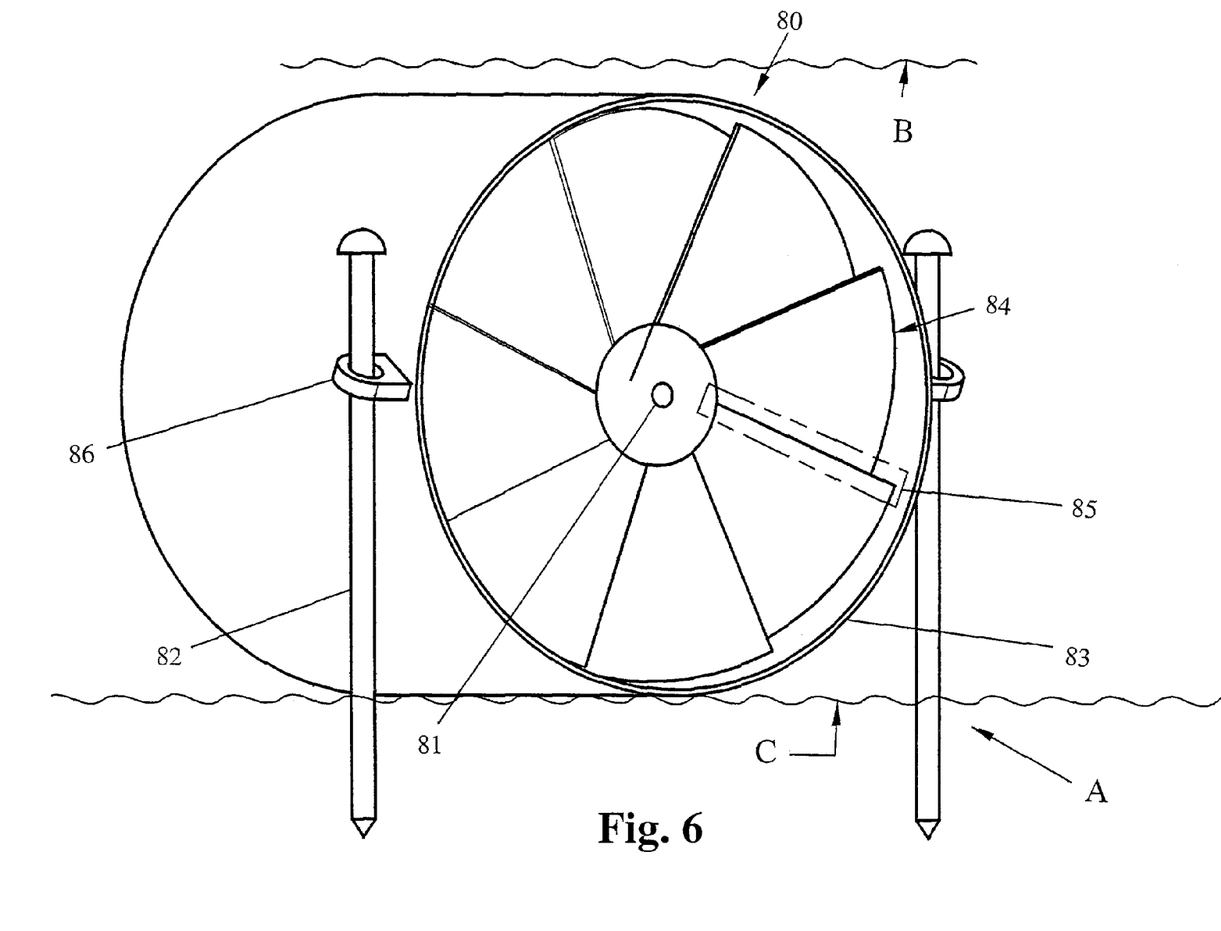
FIG. 6 is a perspective view of an anchored fan turbine portable power generating device.

FIG. 6 illustrates a below surface fan turbine portable power generating device 80 used for converting potential energy from flowing water or water current to mechanical and/or electrical energy. The below water fan turbine portable power generating device 80 has an axle 81. The axle 81 is rotatably mounted to a housing 83. Vanes 84 are operatively mounted to a circumference of the axle 81. The vanes 84 are angled so that the when the current or moving water contacts the vanes 84, it causes the vanes 84 to rotate. Space 85 is provided between each of the vanes 84. The vanes 84 are transverse to the current or moving water. The below water fan turbine portable power generating device 80 is anchored to the bottom surface of a body of water, such as a channel, river, stream or the like, by spikes 82. Anchoring yokes 86 are operatively connected to the housing 83. The anchoring yokes 86 receive the spikes 82. The spikes 82 go though the anchoring yokes 86 and are placed into the bottom surface of the body of water providing an anchoring effect for the below water fan turbine portable power generating device 80. The axle 81 is operatively connected to a collective (not shown). The collective is any arrangement of axles, gears, pulleys, chains, belts sprockets, shafts, pumps, plates, clutches or cables that transfers rotational force from any axle or collective output. Specific embodiments illustrated herein are the best mode operation and not meant to be limiting to said illustration. The vanes 84 of the below water fan turbine portable power generating device 80 move when the water current or moving water contacts the vanes 84 causing it to rotate along with the axle 81. The rotational movement from the axle 81 is transferred to the collective. The collective transfers the rotational movement to at least one power conversion unit (not shown), wherein the at least one power conversion unit converts the rotational movement to electrical, mechanical or some other form of useful and useable energy. The power conversion unit is an electrical generator, hydraulic pump, air pump, or water pump. The power conversion unit is located remote from the water but is capable of being submerged in the water in a waterproof design.

Figure 7:
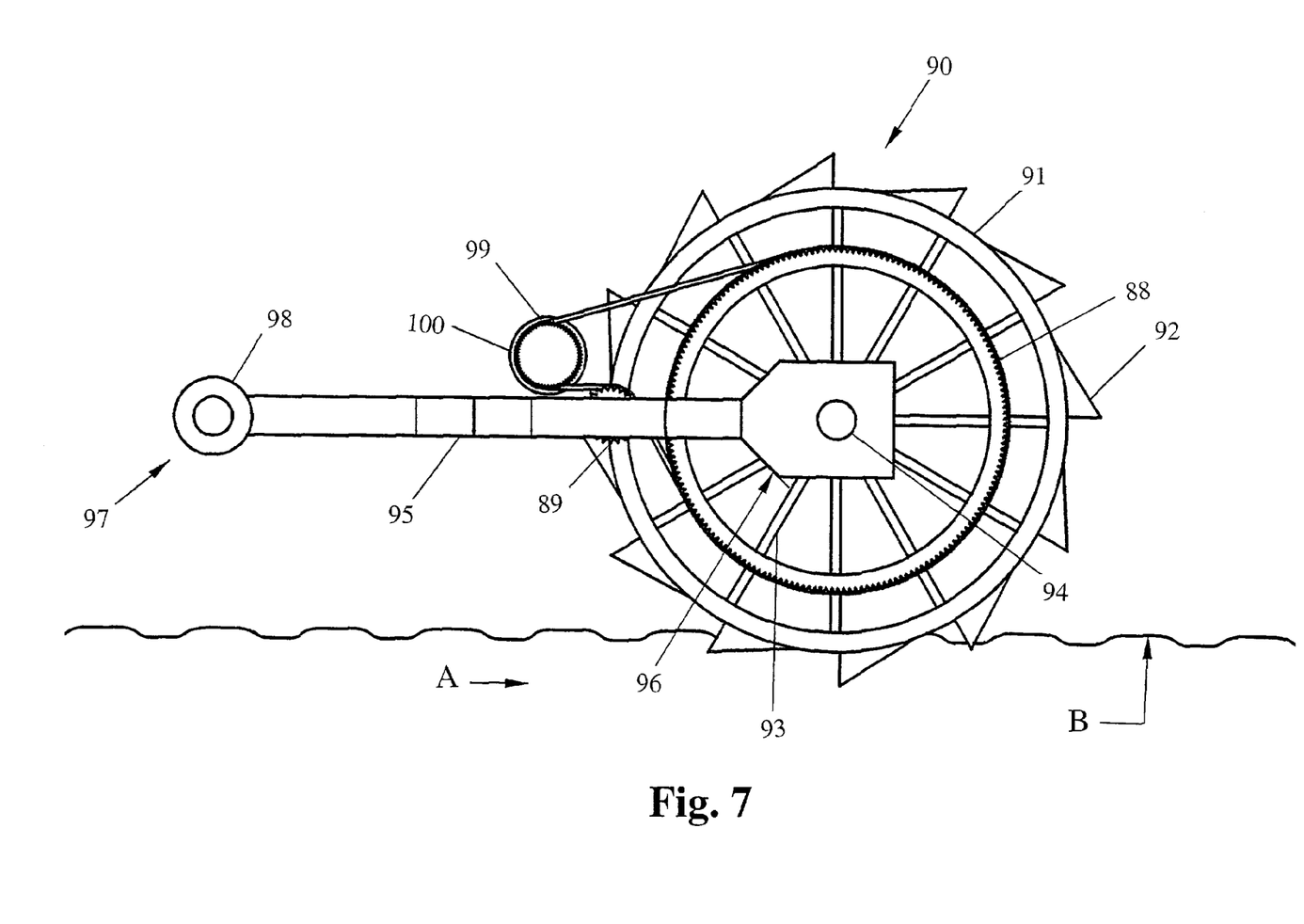
FIG. 7 is a side view of a surface strider portable power generating device.

FIG. 7 illustrates a surface strider portable power generating device 90 used for converting potential energy from flowing water or water current to mechanical and/or electrical energy. The surface strider portable power generating device 90 has an outer rim 91. The outer rim 91 is substantially circular and has buoyancy. Vanes 92 are operatively mounted around the circumference of the outer rim 91. The vanes 92 have buoyancy and are substantially rectangular. Spokes 93 operatively connect the outer rim 91 and the vanes 92 to an axle 94. At least one frame 95 receives the axle 94 at an at least one first end 96 of the at least one frame 95. The axle 94 is rotatably mounted in the at least one frame 95. At least one second end 97 of the at least one frame 95 has at least one anchoring yoke 98. At least one axle gear 88 is operatively attached to the spokes 93. A frame gear 89 is operatively mounted to the at least one frame 95 and is operatively connected to the at least one axle gear 88. The frame gear 89 is operatively connected to at least one power conversion unit gear 99. The at least one power conversion unit gear 99 is operatively connected to at least one power conversion unit 100.

The at least one anchoring yoke 98 is used to anchor the surface strider portable power generating device 90. At least one anchoring cable (not shown) is connected to the at least one anchoring yoke 98 and an anchoring device (not shown) to preclude the surface strider portable power generating device 90 from being carried away by the water current or flowing water. Similar to FIG. 1, the water current or moving water contacts the vanes 92 thereby causing the axle 94 to rotate. As the axle 94 rotates, the at least one axle gear 88 rotates, and the at least one axle gear 88 causes the frame gear 89 to rotate. The frame gear 89 causes the at least one power conversion unit gear 99 to rotate. The at least one power conversion unit gear 99 is rotated and operatively communicates with the at least one power conversion unit 100. The power conversion unit is an electrical generator, hydraulic pump, air pump, or water pump. The at least one power conversion unit 100 converts the rotational energy to electrical, mechanical or some other form of useful and useable energy.

The transfer of rotational movement from the surface strider portable power generating device to the at least one power conversion unit is similar to that shown in FIG. 1. There are numerous embodiments that can capture the rotational movement from the axle 94, the spokes 93 or the vanes 92.

Figure 8:
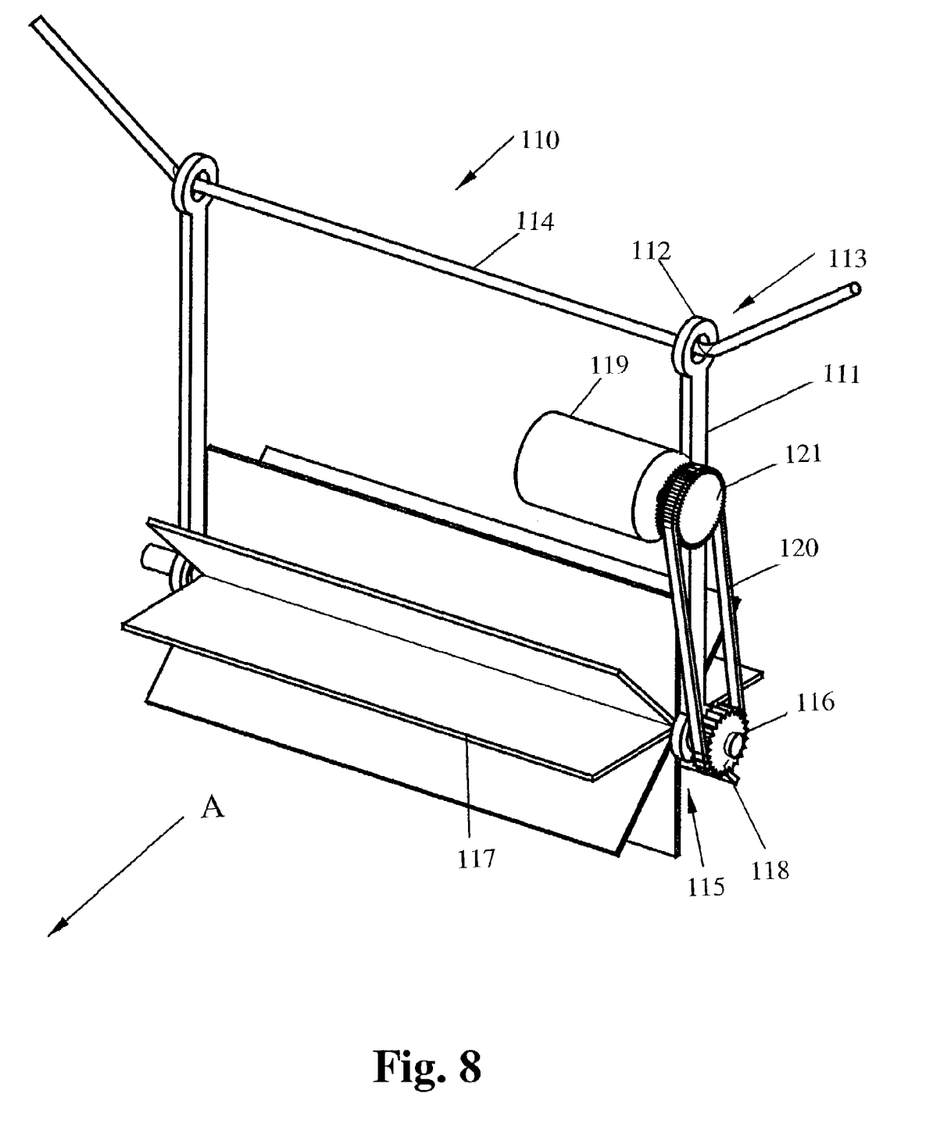
FIG. 8 is a perspective view of a spindle axle portable power generating device.

FIG. 8 illustrates a spindle axle portable power generating device 110 used for converting potential energy from flowing water or water current to mechanical and/or electrical energy. The spindle axle portable power generating device 110 has at least one frame 111. The at least one frame 111 has a carrying yoke 112 at a first end 113. The carrying yoke 112 has an opening for receiving an anchoring cable 114. The anchoring cable 114 is operatively connected to an anchoring device (not shown). The at least one frame 111 has a second end 115 connected to an axle 116. The axle 116 is rotatably mounted to the second end 115 of the at least one frame 111 and is free to rotate therein. Vanes 117 are operatively connected to the axle 116. The vanes 117 are operatively mounted to the circumference of the axle 116 along the horizontal direction as shown in FIG. 8. At least one collective gear 118 is operatively mounted on the axle 116. The at least one collective gear 118 rotates along with the axle 116. At least one power converting unit 119 is operatively mounted on the at least one frame 111.

At least one power converting unit gear 121 is operatively mounted to the power converting unit 119. At least one collective 120 connects the at least one collective gear 118 to the at least one power converting unit gear 121. As the axle 116 and the at least one collective gear 118 rotates, the at least one collective 120 transfers the rotation to the at least one power conversion unit gear 121. The power conversion unit gear 121 transfers the rotation to the power conversion unit 119, which converts the rotational movement to electrical, mechanical or some other form of useful and useable energy. The power conversion unit 119 is an electrical generator, hydraulic pump, air pump, or water pump.

The spindle axle portable power generating device 110 is anchored to the anchoring device via the at least one anchoring cable 114 and the at least one anchoring yoke 112 so that the vanes 117 of the spindle axle portable power generating device 110 are positioned in a current or moving water. The current or moving water contacts the vanes 117 thereby causing the axle 116 to rotate. As the axle 116 rotates, the at least one collective gear 118 rotates causing the collective 120 to move thereby causing the power conversion unit gear 121 to rotate. The at least one power conversion unit gear 118 is rotated and operatively communicates with the at least one power conversion unit 119. As the at least one power conversion unit gear 118 rotates, the at least one power conversion unit 119 converts the rotational energy to electrical, mechanical or some other form of useful and useable energy.

Figure 9:
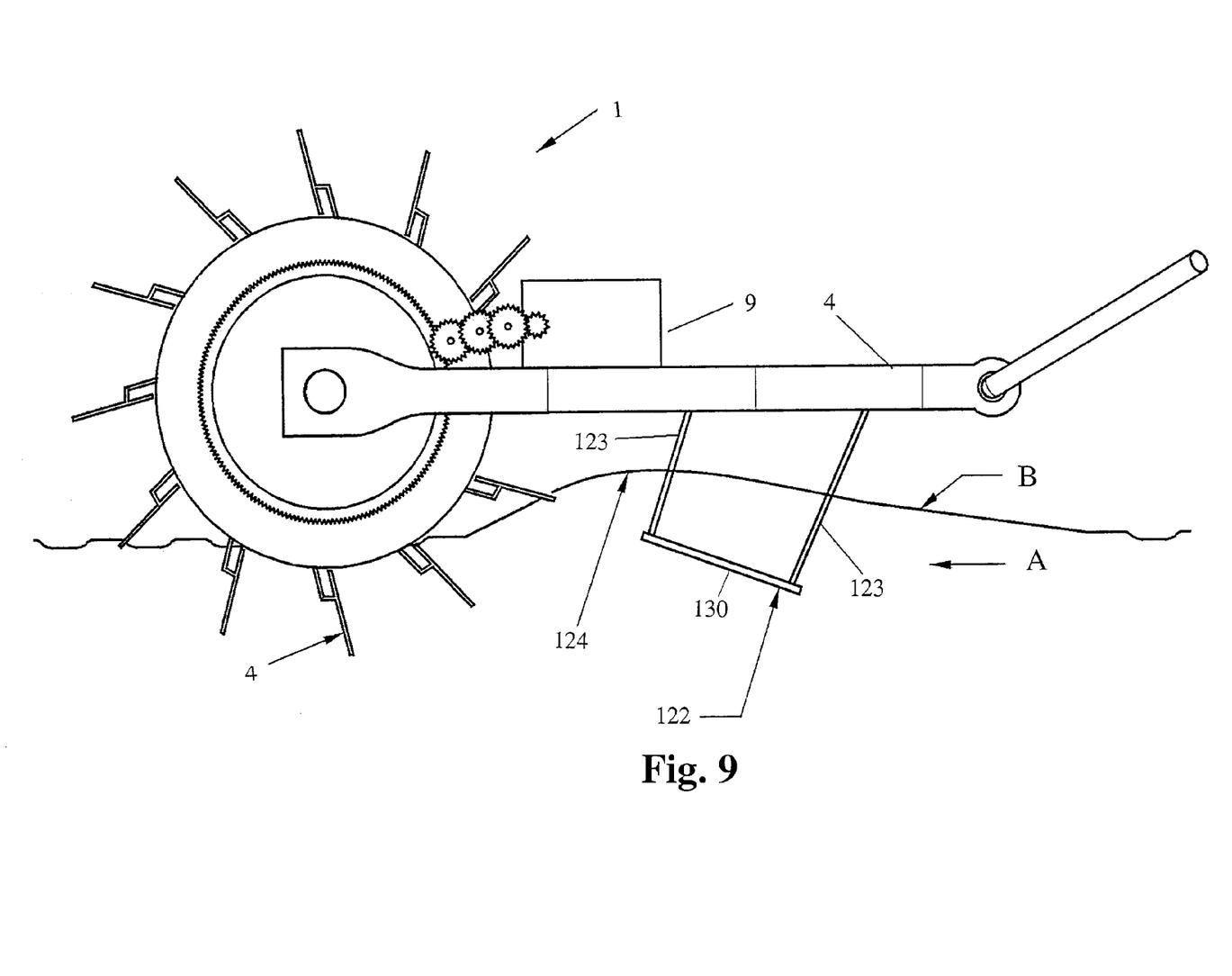
FIG. 9 is a side view of a single drum portable power generating device as shown in FIG. 1 having a wave generating device.

FIG. 9 illustrates a wave generating device 122 as described in Disclosure Document 494764, Jun. 4, 2001, which is hereby incorporated by reference and attached hereto. The wave generating device 122 is used to increase the power of the flowing water delivered into any one of the previously discussed portable power generating devices. The wave generating device 122 has a flat or curved member 130, which is placed upstream of the portable power generating device. The flat or curved member 130 angled upward or transverse to the direction of the water's current and below the surface of the water.

The flat or curved member 130 directs the flowing water upward thereby causing a standing wave 124. The standing wave 124 rises above the water surface and contacts the wave generating device 122 with more force than the "normal current." The vanes 2 of the portable power generating device receive the standing wave 124. The standing wave 124 created by the wave generating device 122 increases the kinetic energy of the water's flowing current by adding the weight of the falling water in the collapsing wave 124 to the speed of the current driving the vanes 2 of the portable power generating device. The wave generating device 122 is operatively mounted to the frame 4 of the portable power generating device by at least one strut 123.

Figure 10A:
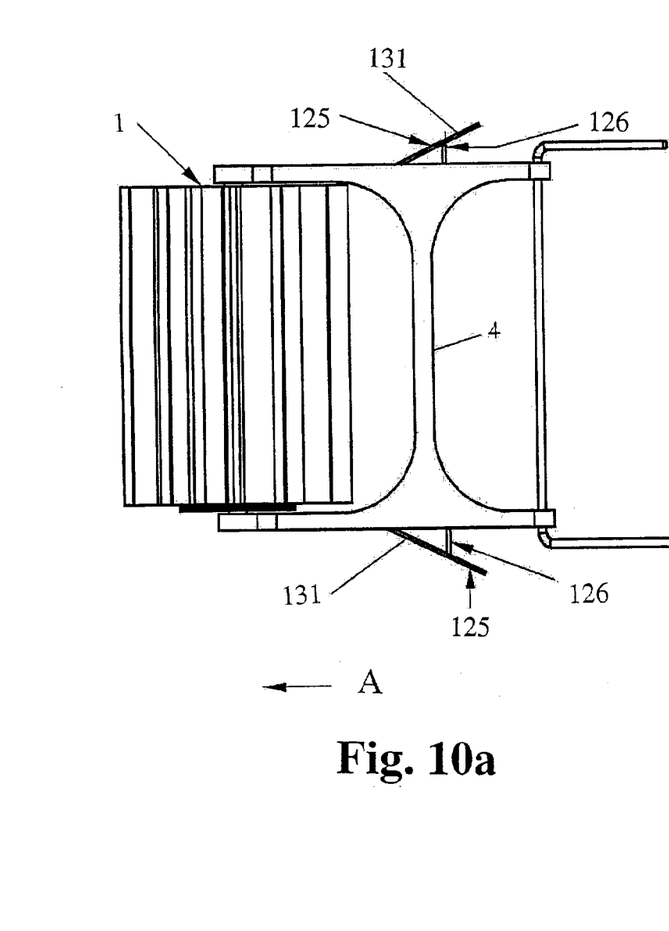
FIG. 10a is a top view of a single drum portable power generating device as shown in FIG. 1 having a wave directing device.
Figure 10B:
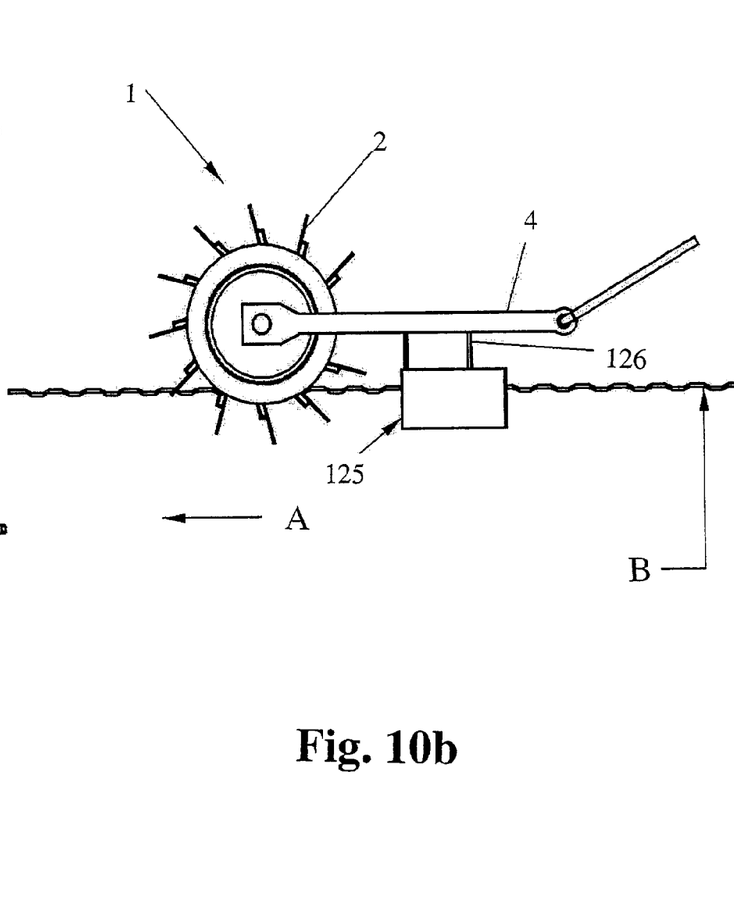
FIG. 10b is a side view of a single drum portable power generating device as shown in FIG. 1 having a water directing device.

FIGS. 10a and 10b illustrate a water directing device 125 as described in Disclosure Document 494831, Jun. 4, 2001, which is hereby incorporated by reference and attached hereto. The water directing device 125 is used to increase the power of the flowing water delivered into any one of the previously discussed portable power generating devices. The water directing device 125 has a flat or curved support 131, which is placed upstream from the portable power generating device. The flat or curved support 131 extends from above to below the normal surface elevation of the flowing water. The flat or curved support 131 is preferable operatively mounted to both sides of the portable power generating device. The flat or curved support 131 of the water directing device 125 are angled inward (toward the vanes 2) and increases the speed and volume of the current moving toward the water directing device 125. The flat or curved support 131 of the water directing device 125 is attached to the frame 4 of the portable power generating device 1 by at least one strut 126.

In view of the foregoing, it will be seen that the several advantages of the invention are achieved and attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions herein described and illustrated without departing from the scope of the invention, it is intended that all matter contained in the foregoing description or shown in the accompanying drawings shall be interpreted as illustrative rather than limiting. For example, while the vanes are illustrated as being fixed, the vanes could equally be of moveable design, such as a variable pitch design. Thus, the breadth and scope of the present invention should not be limited by any of the above-described exemplary embodiments, but should be defined only in accordance with the following claims appended hereto and their equivalents.

What is claimed is:

1. A power generating device motivated by a moving fluid, comprising:
   a rigid frame having a first end and a second end;
   an anchoring yoke operatively mounted on said first end of said rigid frame;
   at least one axle rotatably connected with said rigid frame at said second end;
   at least one buoyant cylinder operatively connected to said at least one axle;
   a plurality of vanes operatively mounted on said at least one buoyant cylinder;
   a power conversion unit operatively connected to said rigid frame;
   a wave generating device having a member and at least one strut, wherein said at least one strut operatively connects said member to said rigid frame; and
   wherein said at least one buoyant cylinder is operatively connected with said power conversion unit, such that said rigid frame is held substantially stationary within the moving fluid by said anchoring yoke, the moving fluid contacts said plurality of vanes which causes said at least one buoyant cylinder to rotate about said at least one axle, said at least one rotating buoyant cylinder moves said power conversion unit.

2. The power generating device according to claim 1, wherein said power conversion unit is selected from the group consisting of an electrical generator, a hydraulic pump, an air pump, and a water pump.

3. The power generating device according to claim 1 wherein said operative connection of said buoyant cylinder with said power conversion unit is selected from the group consisting of a gear train, a chain and sprocket assembly, a cable, and a resilient belt.

4. The power generating device according to claim 1 wherein each one of said plurality of vanes is obliquely mounted on said at least one buoyant cylinder.

5. The power generating device according to claim 1 wherein each one of said plurality of vanes is transversely mounted on said at least one buoyant cylinder.

6. The power generating device according to claim 1 wherein each one of said plurality of vanes is longitudinally mounted on said at least one buoyant cylinder.

7. The power generating device according to claim 6, wherein each one of said plurality of vanes is buoyant.

8. A power generating device motivated by a moving fluid, comprising:
   a rigid frame having a first end and a second end;
   an anchoring yoke operatively mounted on said first end of said rigid frame;
   at least one axle rotatably connected with said rigid frame at said second end;
   at least one buoyant cylinder operatively connected to said at least one axle;
   a power conversion unit operatively connected to said rigid frame;
   a water directing device having at least one strut and a support with two ends, wherein one of said ends of said support is operatively connected to said rigid frame and said at least one strut operatively connects said support to said rigid frame; and
   wherein said at least one buoyant cylinder is operatively connected with said power conversion unit, such that said rigid frame is held substantially stationary within the moving fluid by said anchoring yoke, the moving fluid contacts said plurality of vanes which causes said at least one buoyant cylinder to rotate about said at least one axle, said at least one rotating buoyant cylinder moves said power conversion unit.

9. A power generating device motivated by a moving fluid, comprising:
   a rigid frame having a first end and a second end;
   an anchoring yoke operatively mounted on said first end of said rigid frame;
   at least one axle rotatably connected with said rigid frame at said second end;
   at least one buoyant cylinder operatively connected to said at least one axle;
   a plurality of vanes operatively mounted on said at least one buoyant cylinder;
   a power conversion unit operatively connected to said rigid frame;
   wherein said at least one buoyant cylinder is operatively connected with said power conversion unit, such that said rigid frame is held substantially stationary within the moving fluid by said anchoring yoke, the moving fluid contacts said plurality of vanes which causes said at least one buoyant cylinder to rotate about said at least one axle, said at least one rotating buoyant cylinder moves said power conversion unit;
   each one of said plurality of vanes is longitudinally mounted on said at least one buoyant cylinder;
   each one of said plurality of vanes is buoyant; and
   a plurality of spokes operatively connecting said at least one buoyant cylinder and said at least one axle.

10. A power generating device motivated by a moving fluid, comprising:
   an adjustable frame having front and rear struts;
   an adjustment device for adjusting said adjustable frame;
   at least one axle rotatably connected with said adjustable frame;
   at least two buoyant cylinders operatively connected to said adjustable frame, said at least two buoyant cylinders being longitudinally adjacent to one another and each of said at least two buoyant cylinders having an anchoring yoke;
   a plurality of vanes operatively mounted on said at least one axle and between said front and rear struts;
   a power conversion unit operatively mounted on one of said rear struts;
   an operatively connection of said at least one axle and said power conversion unit, such that said adjustable frame is held substantially stationary within the moving fluid by the anchoring yoke, whereby when the moving fluid contacts said plurality of vanes said at least one axle rotates, said at least one rotating axle moves said power conversion unit; and
   a nose cone operatively connected to said at least one axle and to at least one of said plurality of vanes.

11. A power generating device motivated by a moving fluid, comprising:
  an adjustable frame having front and rear struts;
  an adjustment device for adjusting said adjustable frame;
  at least one axle rotatably connected with said adjustable frame;
  at least two buoyant cylinders operatively connected to said adjustable frame, said at least two buoyant cylinders being longitudinally adjacent to one another and each of said at least two buoyant cylinders having an anchoring yoke;
  a plurality of vanes operatively mounted on said at least one axle and between said front and rear struts;
  a power conversion unit operatively mounted on one of said rear struts;
  wherein said at least one axle is operatively connected to said power conversion unit, such that said adjustable frame is held substantially stationary within the moving fluid by the anchoring yoke, the moving fluid contacts said plurality of vanes causing said at least one axle to rotate, said at least one rotating axle moving said power conversion unit; and
  at least one middle section operatively connected to said adjustable frame, wherein said at least one middle section limits the adjustment of said adjustment device.

12. A power generating device motivated by a moving fluid, comprising:
  a rigid frame having a first end and a second end;
  at least one axle rotatably connected with said rigid frame at said first end;
  at least one buoyant cylinder operatively connected to said at least one axle, said buoyant cylinder being operatively connected to a power conversion unit;
  a plurality of vanes operatively mounted on said at least one buoyant cylinder such that when the moving fluid contacts said plurality of vanes, said at least one buoyant cylinder rotates about said at least one axle, said at least one rotating buoyant cylinder thereby moving said power conversion unit; and
  a wave generating device being operatively connected to said second end of said rigid frame.

13. A power generating device motivated by a moving fluid, comprising:
  a rigid frame having a first end and a second end;
  an anchoring yoke operatively mounted on said first end of said rigid frame such that said rigid frame is held substantially stationary within the moving fluid by said anchoring yoke;
  at least one axle rotatably connected with said rigid frame at said second end;
  at least one buoyant cylinder operatively connected to said at least one axle;
  a power conversion unit being operatively connected with one of said axle or said buoyant cylinder;
  a plurality of vanes, each one of said plurality of vanes being mounted on said at least one buoyant cylinder; and
  a fluid directing device in operative communication with said power generating device;
  wherein the moving fluid contacts said plurality of vanes as directed by said fluid directing device, causing said at least one buoyant cylinder to rotate about said at least one axle, and one of said buoyant cylinder or said axle moving said power conversion unit.

14. A power generating device motivated by a moving fluid, comprising:
  a rigid frame having a first end and a second end;
  at least one axle rotatably connected with said rigid frame at said first end;
  a plurality of vanes operatively mounted on said at least one axle;
  a power conversion unit operatively connected to said rigid frame and operatively connected to said at least one axle such that when the moving fluid contacts said plurality of vanes, said at least one axle rotates said power conversion unit; and
  a fluid directing device operatively associated with said plurality of vanes such that the moving fluid contacts said plurality of vanes as directed by said fluid directing device
  wherein at least one buoyant cylinder is operatively connected to said axle and to said plurality of vanes.

15. The power generating device according to claim 14, wherein at least two buoyant cylinders are axially adjacent.

16. The power generating device according to claim 14, wherein said at least two buoyant cylinders are longitudinally adjacent.

17. The power generating device of claim 14 further comprising spokes connecting said buoyant cylinder with said axle.

18. A power generating device motivated by a moving fluid, comprising:
  a rigid frame having a first end and a second end;
  at least one axle rotatable connected with said rigid frame at said first end;
  a plurality of vanes operatively mounted on said at least one axle;
  a power conversion unit operatively connected to said rigid frame and operatively connected to said at least one axle such that when the moving fluid contacts said plurality of vanes, said at least one axle rotates said power conversion unit; and
  a fluid directing device operatively associated with said plurality of vanes such that the moving fluid contacts said plurality of vanes as directed by said fluid directing device wherein at least two of said plurality of vanes are buoyant.

19. A power generating device motivated by a moving fluid, comprising:
  a rigid frame having a first end and a second end;
  at least one axle rotatable connected with said rigid frame at said first end;
  a plurality of vanes operatively mounted on said at least one axle;
  a power conversion unit operatively connected to said rigid frame and operatively connected to said at least one axle such that when the moving fluid contacts said plurality of vanes, said at least one axle rotates said power conversion unit; and
  a fluid directing device operatively associated with said plurality of vanes such that the moving fluid contacts said plurality of vanes as directed by said fluid directing device further comprising an adjustment device operatively connected to said fluid direction device whereby said fluid directing device may be selectively varied.

* * * * *